US012080963B1

(12) United States Patent
Chen et al.

(10) Patent No.: US 12,080,963 B1

(45) Date of Patent: Sep. 3, 2024

(54) ELECTRICAL CONNECTOR ASSEMBLY AND ITS MANUFACTURING METHOD

(71) Applicants: Dongguan Tarng Yu Electronics Co., Ltd., Dongguan (CN); Tarng Yu Enterprise co., ltd., New Taipei (TW)

(72) Inventors: Ying-Chung Chen, New Taipei (TW); Mu-Jung Huang, New Taipei (TW)

(73) Assignees: DONGGUAN TARNG YU ELECTRONICS CO., LTD., Dongguan (CN); TARNG YU ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 18/595,452

(22) Filed: Mar. 5, 2024

(30) Foreign Application Priority Data

Jul. 14, 2023 (TW) ................................ 112126461

(51) Int. Cl.

*H01R 11/01* (2006.01)
*H01R 11/09* (2006.01)
*H01R 13/506* (2006.01)
*H01R 43/26* (2006.01)

(52) U.S. Cl.

CPC ............. *H01R 11/01* (2013.01); *H01R 11/09* (2013.01); *H01R 13/506* (2013.01); *H01R 43/26* (2013.01)

(58) Field of Classification Search

CPC ...... H01R 11/01; H01R 11/09; H01R 13/506; H01R 43/26

See application file for complete search history.

(56) References Cited

U.S. PATENT DOCUMENTS

| | | | | |
|---|---|---|---|---|
| 5,915,975 A * | 6/1999 | McGrath | .............. | H01R 12/716 439/74 |
| 7,190,180 B2 * | 3/2007 | Yamada | ................. | H01R 11/01 439/91 |
| 11,289,837 B2 * | 3/2022 | Lin | .................... | H01R 13/6585 |

OTHER PUBLICATIONS

CN116667015 Hung et al. Entire Document (Year: 2023).*

* cited by examiner

*Primary Examiner* — Briggitte R. Hammond

(74) *Attorney, Agent, or Firm* — Chun-Ming Shih; LANWAY IPR SERVICES

(57) ABSTRACT

An electrical connector assembly and its manufacturing method are described, wherein the electrical connector assembly includes a bridging conductive component. The multiple conductive terminals achieve electrical connection through the bridging conductive component without the use of jumper wires, meeting the requirements for signal transmission in the electrical connector assembly. The manufacturing method of the electrical connector assembly involves the step of combining multiple electrical connector components with the bridging conductive component. Thus, during the assembly of the electrical connector assembly, customization of the electrical connection relationship of conductive terminals can be achieved by adjusting multiple electrical connector components and the bridging conductive component. This customization ensures compliance with the requirements for signal transmission in the electrical connector assembly, meeting the specific needs and developments of electronic devices.

13 Claims, 15 Drawing Sheets

B-B

B'-B'

ELECTRICAL CONNECTOR ASSEMBLY AND ITS MANUFACTURING METHOD

CROSS-REFERENCE TO RELATED APPLICATIONS

This application claims the priority of Republic of China Patent Application No. 112126461 filed on Jul. 14, 2023, in the State Intellectual Property Office of the R.O.C., the disclosure of which is incorporated herein by reference.

BACKGROUND OF THE INVENTION

Field of the Invention

This application relates to the field of electronic device technology. More specifically, it relates to an electrical connector assembly and its manufacturing method that enables multiple conductive terminal electrical connections to be established without the need for jumper wires.

Descriptions of the Related Art

In various modern electronic devices, electrical connector assemblies are usually equipped to provide signal transmission. In response to the special needs and development of electronic equipment, however, multiple conductive terminals on the electrical connector assembly may need to be electrically connected to each other. In this regard, jumpers that are coordinated with the electrical connector assembly are the only choice for the current industry to achieve electrical connections among multiple conductive terminals on the electrical connector assembly. Nevertheless, the use of the jumpers will occupy the internal space of the electronic device. This may cause electronic devices cannot keep develop in the direction of being thin, light and short.

In view of this, how to achieve electrical connections among multiple conductive terminals on the electrical connector assembly without using jumpers has become a technical issue that the industry is eager to overcome.

SUMMARY OF THE INVENTION

In view of the drawbacks of the prior art said above, the present application provides an electrical connector assembly, wherein the electrical connector assembly includes a joining insulation colloid material, including a colloid material joining structure; a major electrical connector component, including a major insulation colloid material, a major non-bridging conductive terminal, a major first bridging conductive terminal and a major second bridging conductive terminal, wherein the major insulation colloid material positions and separates the major non-bridging conductive terminal, the major first bridging conductive terminal and the major second bridging conductive terminal, and the major insulation colloid material includes a major electrical connector component combining structure and a major electrical connector joining structure; a minor electrical connector component, including a minor insulation colloid material, a minor non-bridging conductive terminal, a minor first bridging conductive terminal and a minor second bridging conductive terminal, wherein the minor insulation colloid material positions and separates the minor non-bridging conductive terminal, the minor first bridging conductive terminal and the minor second bridging conductive terminal, and the minor insulation colloid material includes a minor electrical connector component combining structure and a minor electrical connector joining structure; and a bridging conductive component, including a bridging conductive component body, a major first abutting structure, a major second abutting structure, a minor first abutting structure, a minor second abutting structure, a bridging conductive component combining structure and a bridging conductive component joining structure; wherein the bridging conductive component is located between the major electrical connector component and the minor electrical connector component so that the major electrical connector component combining structure, the bridging conductive component combining structure and the minor electrical connector component combining structure can coordinate, allowing the major electrical connector component, the bridging conductive component and the minor electrical connector component can be combined to form an electrical connector assembly combination; the bridging conductive component body bridges the major non-bridging conductive terminal and the minor non-bridging conductive terminal in the electrical connector assembly combination, allowing the major first abutting structure, the major second abutting structure, the minor first abutting structure and the minor second abutting structure separately abut against the major first bridging conductive terminal, the major second conductive terminal, the minor first conductive terminal and the minor second conductive terminal; and the joining insulation colloid material joins the electrical connector assembly combination so that the joining insulation colloid material, the major insulation colloid material and the minor insulation colloid material form a colloid material combination, allowing the colloid material joining structure, the major electrical connector component joining structure, the minor electrical connector component joining structure and the bridging conductive component joining structure can coordinate to maintain the combination of the major electrical connector component, the bridging conductive component and the minor electrical connector component.

Preferably, the electrical connector assembly said above, wherein the joining insulation colloid material, the major insulation colloid material and the minor insulation colloid material are seamlessly combined in the colloid material combination.

Preferably, the electrical connector assembly said above, wherein the joining insulation colloid material, the major insulation colloid material and the minor insulation colloid material are combined with seams in the colloid material combination.

Preferably, the electrical connector assembly said above, wherein the colloid material joining structure includes a major colloid material joining substructure, a minor colloid material joining substructure and a bridging colloid material joining substructure, wherein the major colloid material joining substructure, the minor colloid material joining substructure and the bridging colloid material joining substructure can separately join the major electrical connector component joining structure, the minor electrical connector component joining structure and the bridging conductive component joining structure.

Preferably, the electrical connector assembly said above, wherein bridging conductive component joining structure includes a bridging conductive component snapping joining substructure, which snaps the colloid material joining structure to maintain the joining of the joining insulation colloid material and the electrical connector assembly combination.

Preferably, the electrical connector assembly said above, wherein the bridging conductive component snapping joining substructure is a groove structure of a dovetail shape.

Preferably, the electrical connector assembly said above, wherein the major electrical connector component joining structure, the minor electrical connector component joining structure and the bridging conductive component joining structure are groove structures.

Preferably, the electrical connector assembly said above, wherein the bridging conductive component body includes a major bridging wall structure and a minor bridging wall structure; the major first abutting structure and the major second abutting structure are placed on the major bridging wall structure which faces toward the major electrical connector component and crosses over the major non-bridging conductive terminal, allowing the major first abutting structure and the major second abutting structure separately abut against the major first bridging conductive terminal and the major second bridging conductive terminal; and the minor first abutting structure and the minor second abutting structure are placed on the minor bridging wall structure which faces toward the minor electrical connector component and crosses over the minor non-bridging conductive terminal, allowing the minor first abutting structure and the minor second abutting structure separately abut against the minor first bridging conductive terminal and the minor second bridging conductive terminal.

Preferably, the electrical connector assembly said above, wherein the bridging conductive component body includes a connected bending structure, which connects to the major bridging wall structure and the minor bridging wall structure and is bent to make the major bridging wall structure and the minor bridging wall structure separately face toward the major electrical connector component and the minor electrical connector component.

Preferably, the electrical connector assembly said above, wherein the electrical connector assembly combination includes a combining side and a joining side wherein the combining side and the joining side are opposite two sides, wherein the major electrical connector component combining structure, the minor electrical connector component combining structure and the bridging conductive component combining structure are located at the combining side, and the major electrical connector component joining structure, the minor electrical connector component joining structure and the bridging conductive component joining structure are located at the joining side.

Preferably, the electrical connector assembly said above, wherein the major electrical connector component combining structure and the minor electrical connector component combining structure are concave-convex structures that structurally coordinate; and the bridging conductive component combining structure is a through-hole structure that can pass through the major electrical connector component combining structure or the minor electrical connector component combining structure.

Additionally, the application provides a manufacturing method of the electrical connector assembly said above, comprising the following steps: placing the bridging conductive component between the major electrical connector component and the minor electrical connector component; and combining the major electrical connector component, the bridging conductive component and the minor electrical connector component to form the electrical connector assembly combination.

Furthermore, the application provides a manufacturing method of the electrical connector assembly said above, comprising the following steps: placing the bridging conductive component between the major electrical connector component and the minor electrical connector component; combining the major electrical connector component, the bridging conductive component and the minor electrical connector component to form the electrical connector assembly combination; and joining the joining insulation colloid material to the electrical connector assembly combination to maintain the combination of the major electrical connector component, the bridging conductive component and the minor electrical connector component.

Compared to prior art, the electrical connector assembly and its manufacturing method provided in this application, wherein the electrical connector assembly includes a bridging conductive component. By utilizing the bridging conductive component, multiple conductive terminal electrical connections can be achieved without the need for jumper wires, meeting the requirements for signal transmission in the electrical connector assembly. The manufacturing method of the electrical connector assembly involves the step of assembly of multiple electrical connector components with the bridging conductive component. Therefore, during the assembly steps of the electrical connector assembly, customization of the electrical connection relationship of conductive terminals can be achieved by adjusting multiple electrical connector components and the bridging conductive component, ensuring compliance with the signal transmission requirements of the electrical connector assembly, meeting the specific needs and advancements in electronic device technology.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
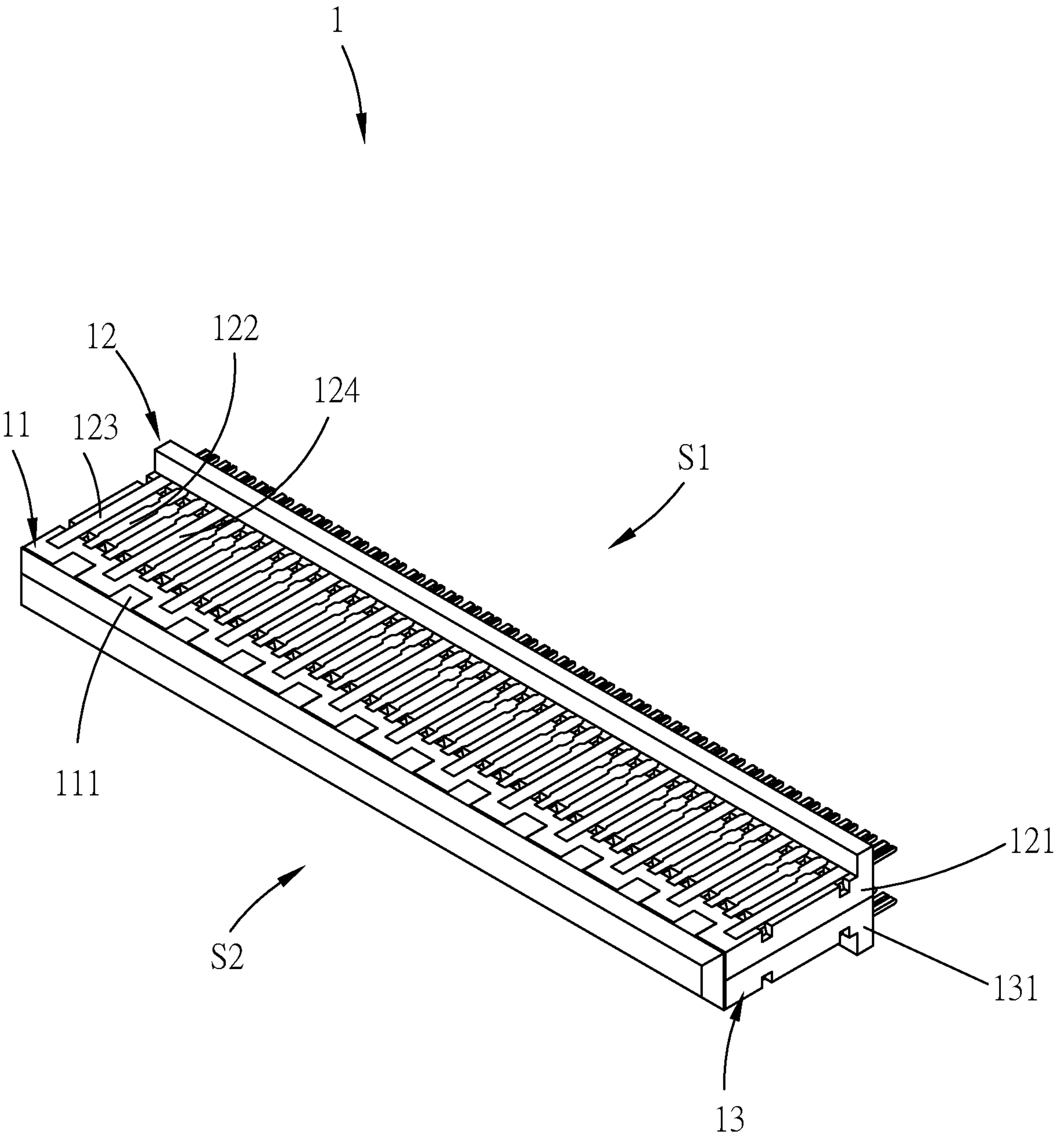
FIG. 1 is a three-dimensional schematic diagram of the electrical connector assembly of the present application in a first angle of view in an embodiment.
Figure 2:
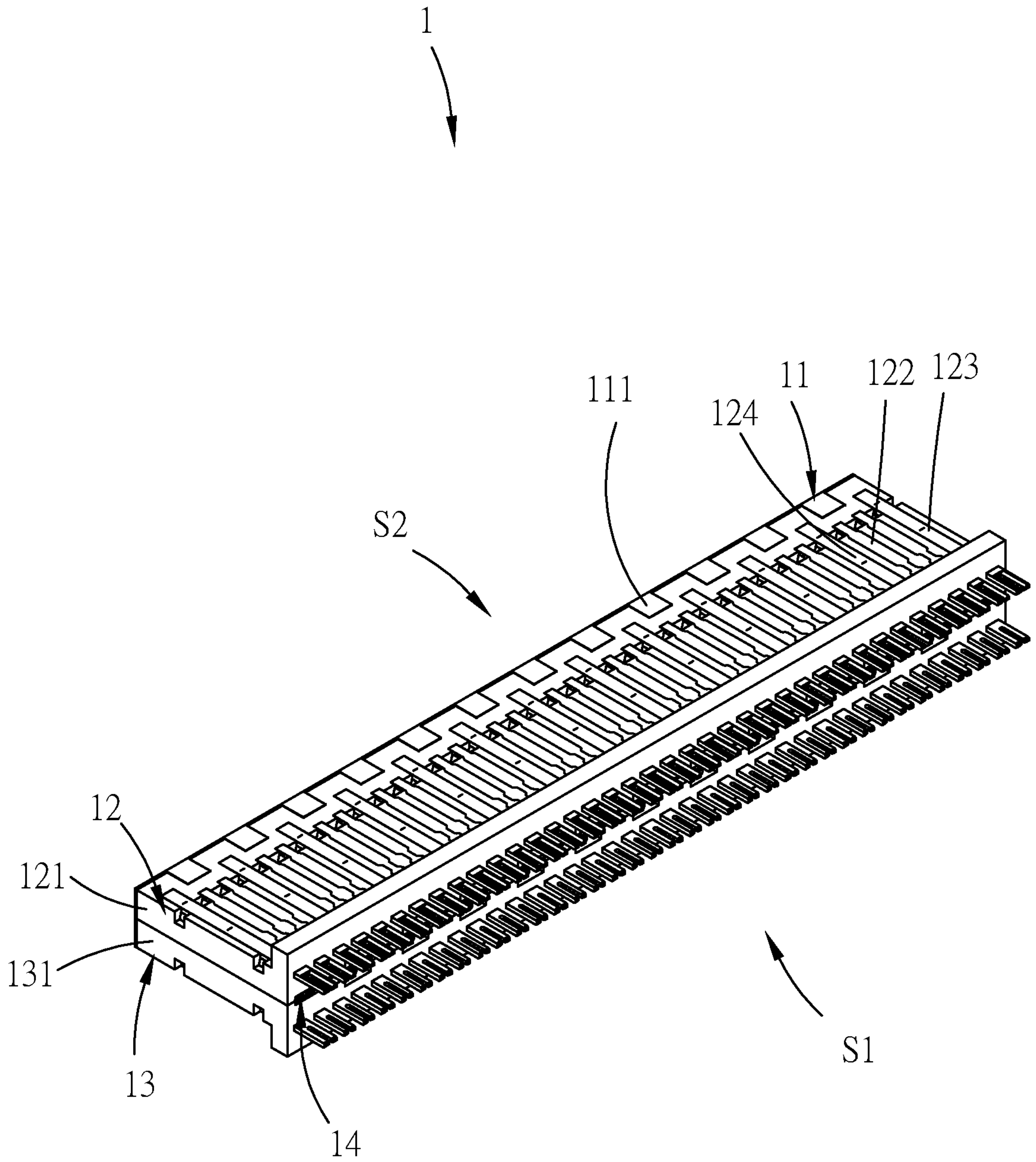
FIG. 2 is a three-dimensional schematic diagram of the electrical connector assembly of the present application in a second angle of view in an embodiment.
Figure 3:
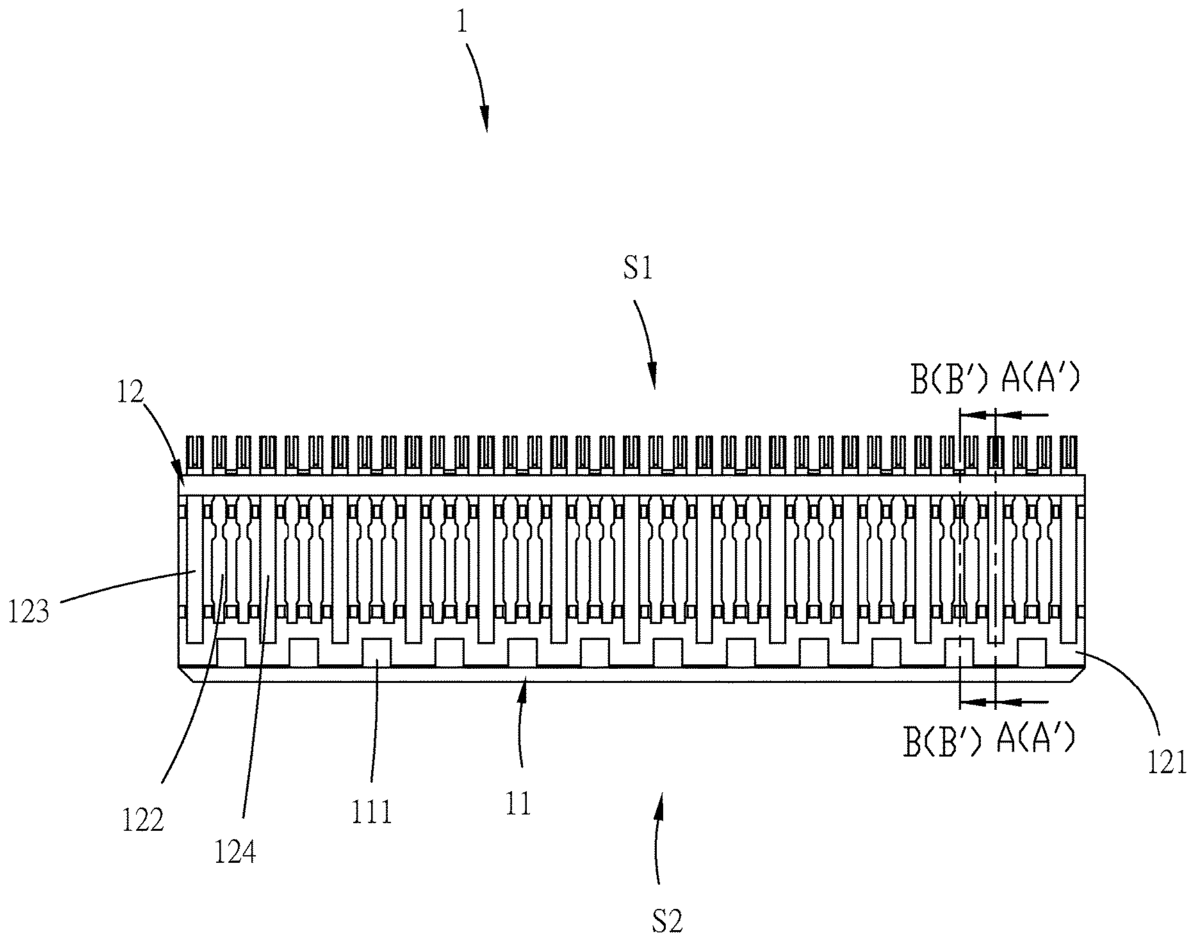
FIG. 3 is a top view of schematic diagram of the electrical connector assembly of the present application in an embodiment.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Additionally, structures or components with the same or similar functions in the following embodiments will be described using the same symbols, and descriptions of common or equivalent technical features will be omitted to simplify and clarify the disclosed content.

The present application provides an electrical connector assembly and its manufacturing method that achieves multiple conductive terminal electrical connections without the need for jumper wires. For the technical concepts of this application, please refer to FIGS. 1 to 13.

In the embodiments shown in FIGS. 1 to 7, the electrical connector assembly 1 includes a joining insulation colloid material 11, a major electrical connector component 12, a minor electrical connector component 13, and a bridging conductive component 14. The joining insulation colloid material 11 has a colloid material joining structure 111.

The major electrical connector component 12 comprises a major insulation colloid material 121, at least one major non-bridging conductive terminal 122, at least one major first bridging conductive terminal 123, and at least one major second bridging conductive terminal 124. The major insulation colloid material 121 positions the major non-bridging conductive terminal 122, the major first bridging conductive terminal 123, and the major second bridging conductive terminal 124, which can provide signal transmission, for keeping the major non-bridging conductive terminal 122, the major first bridging conductive terminal 123, and the major second bridging conductive terminal 124 separated to prevent unnecessary electrical connections among the major non-bridging conductive terminal 122 and the major first bridging conductive terminal 123 and the major second bridging conductive terminal 124. The major insulation colloid material 121 also has a major electrical connector component combining structure 1211 and a major electrical connector component joining structure 1212.

The minor electrical connector component 13 comprises minor insulation colloid material 131, at least one minor non-bridging conductive terminal 132, at least one minor first bridging conductive terminal 133, and at least one minor second bridging conductive terminal 134. The minor insulation colloid material 131 positions the minor non-bridging conductive terminal 132, the minor first bridging conductive terminal 133, and the minor second bridging conductive terminal 134, which can provide signal transmission, for keeping them separated to prevent unnecessary electrical connections among the minor non-bridging conductive terminal 132, the minor first bridging conductive terminal 133 and the minor second bridging conductive terminal 134. The minor insulation colloid material 131 also has a minor electrical connector component combining structure 1311 and a minor electrical connector component joining structure 1312.

The bridging conductive component 14 is optionally made of conductive plastic or conductive metal that can provide signal transmission. In the above embodiments, the bridging conductive component 14 has a bridging conductive component body 141, at least one major first abutting structure 142, at least one major second abutting structure 143, at least one minor first abutting structure 144, at least one minor second abutting structure 145, a bridging conductive component combining structure 146, and a bridging conductive component joining structure 147.

In the above embodiments, the bridging conductive component 14 is positioned between the major electrical connector component 12 and the minor electrical connector component 13. The major electrical connector component combining structure 1211 and the minor electrical connector component combining structure 1311 are protrusion and recess structures which are structurally coordinated. The bridging conductive component combining structure 146 is perforation that can pass through the major electrical connector component combining structure 1211 or the minor electrical connector component combining structure 1311, allowing the major electrical connector component combining structure 1211, the bridging conductive component combining structure 146 and the minor electrical connector component combining structure 1311 are configured to be compatible, and enabling the major electrical connector component 12, the bridging conductive component 14 and the minor electrical connector component 13 to be assembled into an electrical connector assembly combination A.

As shown in FIGS. 10 to 13, the electrical connector assembly combination A has a combining side S1 and a joining side S2, wherein the combining side S1 and the joining side S2 are opposite sides on the electrical connector assembly combination A. It should be noted that the major electrical connector component combining structure 1211, the minor electrical connector component combining structure 1311, and the bridging conductive component combining structure 146 are located on the combining side S1, while the major electrical connector component joining structure 1212, the minor electrical connector component joining structure 1312, and the bridging conductive component joining structure 147 are located on the joining side S2.

In the electrical connector assembly combination A, the bridging conductive component body 141 spans across the major non-bridging conductive terminal 122 and the minor non-bridging conductive terminal 132 allowing the major first abutting structure 142, the major second abutting structure 143, the minor first abutting structure 144, and the minor second abutting structure 145 to respectively abut against the major first bridging conductive terminal 123, the major second bridging conductive terminal 124, the minor first bridging conductive terminal 133, and the minor second bridging conductive terminal 134. As a result, the bridging conductive component 14 achieves the bridging of the major first bridging conductive terminal 123, the major second bridging conductive terminal 124, the minor first bridging conductive terminal 133, and the minor second bridging conductive terminal 134, forming a bridging circuit that achieves electrical connections of multiple conductive terminals without the need for jumper wires, meeting the requirements for signal transmission in the electrical connector assembly.

It should be noted that the bridging circuit can transmit grounding signal to reduce the degree of signal transmission interference on the conductive terminals on the electrical connector assembly, thereby optimizing the transmission speed and quality of signal in the electrical connector assembly. However, this is not limiting, and it is not ruled out that the bridging circuit can provide transmission of other forms of electrical signal to meet the requirements for signal transmission in the electrical connector assembly.

In the above embodiment, the bridging conductive component body 141 has a major bridging wall structure 1411, a minor bridging wall structure 1412, and a connected bending structure 1413. Since the bridging conductive component 14 is positioned between the major electrical connector component 12 and the minor electrical connector component 13, thereby the major bridging wall structure 1411 and the minor bridging wall structure 1412 can be located between the major electrical connector component 12 and the minor electrical connector component 13 to provide shielding and to reduce the degree of signal transmission interference on the major electrical connector component 12 and the minor electrical connector component 13, optimizing the transmission speed and quality of signals in the electrical connector assembly 1, meeting the requirements for signal transmission in the electrical connector assembly 1, satisfying the specific needs and developments in electronic device.

Optionally, the major bridging wall structure 1411 and the minor bridging wall structure 1412 can be positioned between the major non-bridging conductive terminal 122 and the minor non-bridging conductive terminal 132 to provide shielding.

Optionally, the major bridging wall structure 1411 and the minor bridging wall structure 1412 can be combined to form a single structural entity.

In the above embodiment, the connected bending structure 1413 is connected to the major bridging wall structure 1411 and the minor bridging wall structure 1412. The connected bending structure 1413 can bend the bridging conductive component body 141, causing the major bridging wall structure 1411 and the minor bridging wall structure 1412 to respectively face towards the major electrical connector component 12 and the minor electrical connector component 13. The major first abutting structure 142 and the major second abutting structure 143 are positioned on the major bridging wall structure 1411, and the major bridging wall structure 1411 spans across the major non-bridging conductive terminal 122, allowing the major first abutting structure 142 and the major second abutting structure 143 to respectively abut against the major first bridging conductive terminal 123 and the major second bridging conductive terminal 124. The minor first abutting structure 144 and the minor second abutting structure 145 are positioned on the minor bridging wall structure 1412, and the minor bridging wall structure 1412 spans across the minor non-bridging conductive terminal 132, allowing the minor first abutting structure 144 and the minor second abutting structure 145 to respectively abut against the minor first bridging conductive terminal 133 and the minor second bridging conductive terminal 134.

It should be noted that the major first abutting structure 142, the major second abutting structure 143, the minor first abutting structure 144, and the minor second abutting structure 145 can abut in multiple locations to respectively abut the major first bridging conductive terminal 123, the major second bridging conductive terminal 124, the minor first bridging conductive terminal 133, and the minor second bridging conductive terminal 134, ensuring that the bridging conductive component 14 can abut against the major first bridging conductive terminal 123, the major second bridging conductive terminal 124, the minor first bridging conductive terminal 133, and the minor second bridging conductive terminal 134, achieving bridging for the major first bridging conductive terminal 123, the major second bridging conductive terminal 124, the minor first bridging conductive terminal 133, and the minor second bridging conductive terminal 134.

Additionally, the joining insulation colloid material 11 can join the electrical connector assembly combination A, allowing the joining insulation colloid material 11, the major insulation colloid material 121, and the minor insulation colloid material 131 to combine into a colloid material combination C, enabling the colloid material joining structure 111, the major electrical connector component joining structure 1212, the minor electrical connector component joining structure 1312, and the bridging conductive component joining structure 147 to be configured to be compatible, thereby maintaining the assembly of the major electrical connector component 12, the bridging conductive component 14, and the minor electrical connector component 13.

Figure 4:
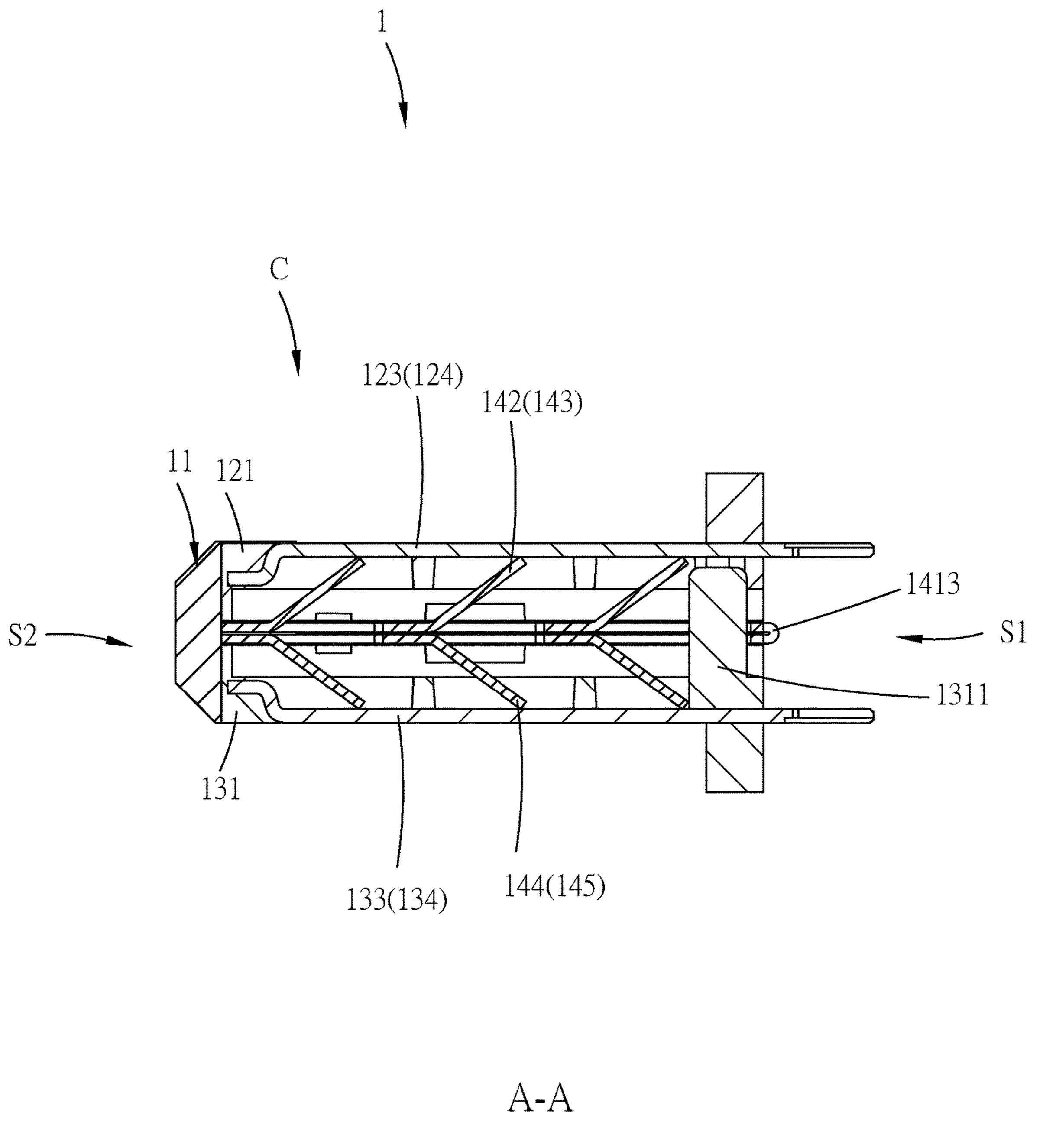
FIG. 4 is a sectional schematic diagram of some components of the combined electrical connector shown in FIG. 3 cut along the line AA.
Figure 4A:
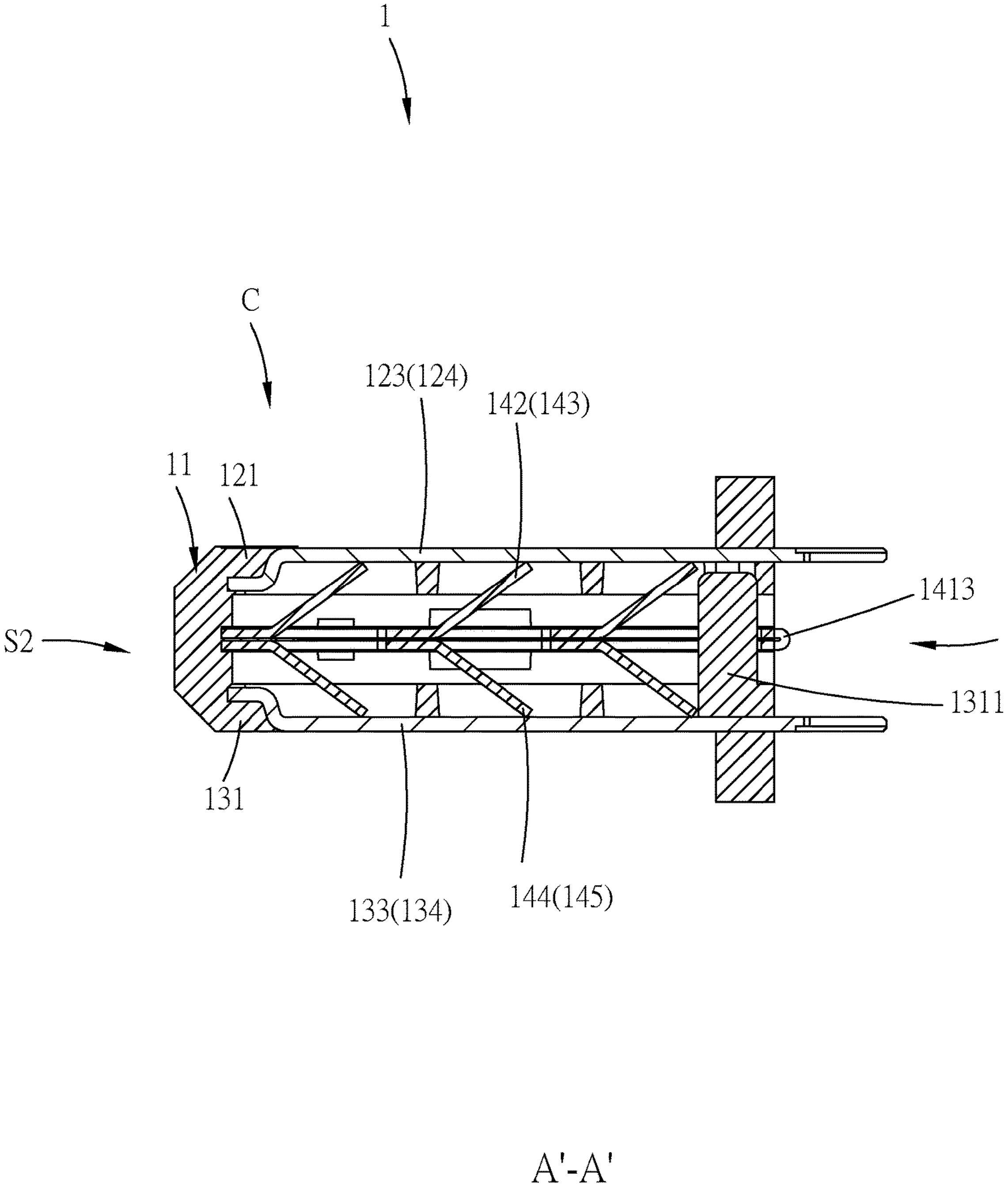
FIG. 4A is a sectional schematic diagram of some components of the combined electrical connector shown in FIG. 3 cut along the line A'A'.
Figure 5:
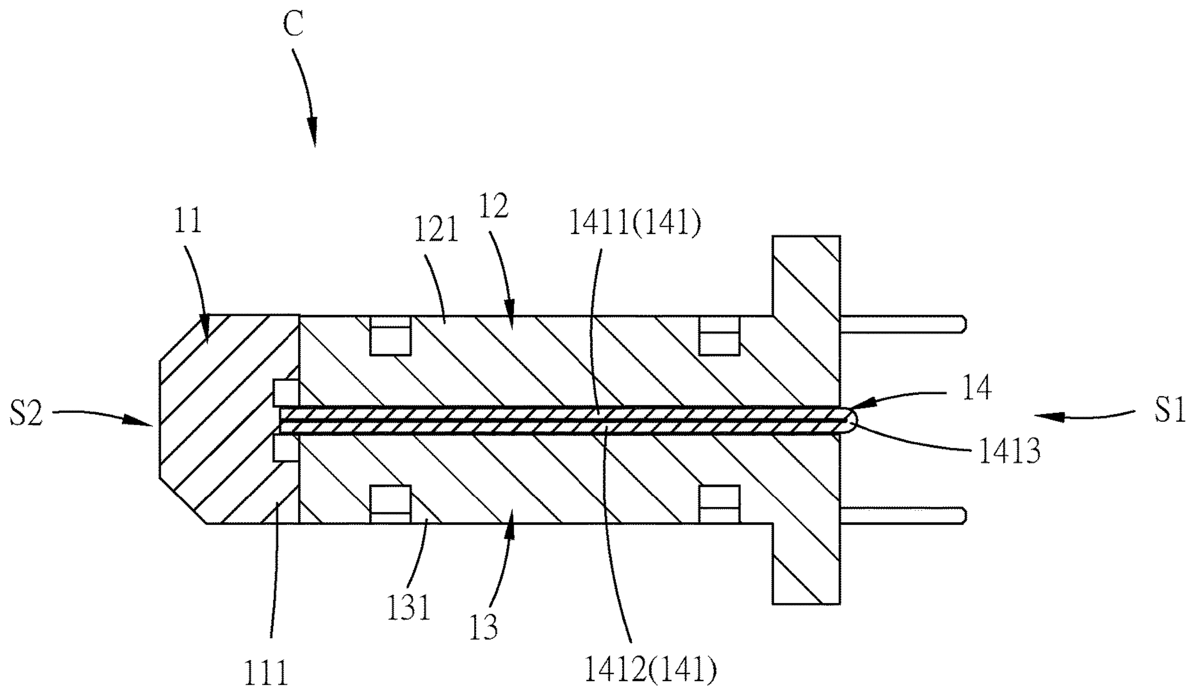
FIG. 5 is a sectional schematic diagram of some components of the combined electrical connector shown in FIG. 3 cut along the line BB.
Figure 5A:
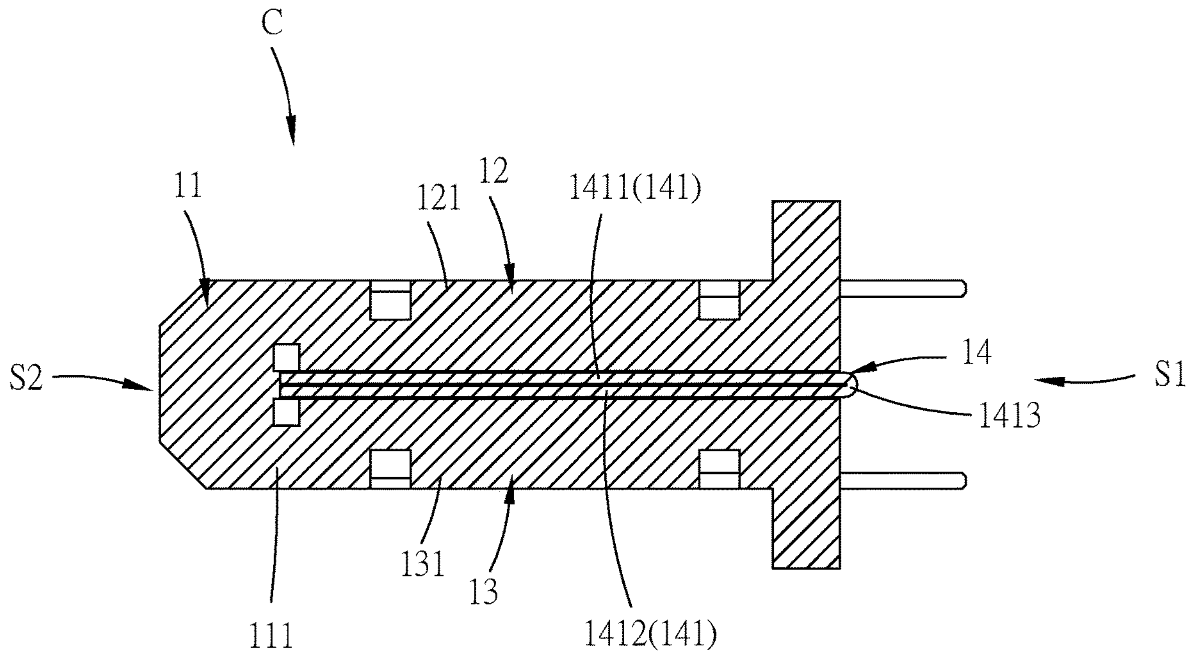
FIG. 5A is a sectional schematic diagram of some components of the combined electrical connector shown in FIG. 3 cut along the line B'B'.
Figure 6:
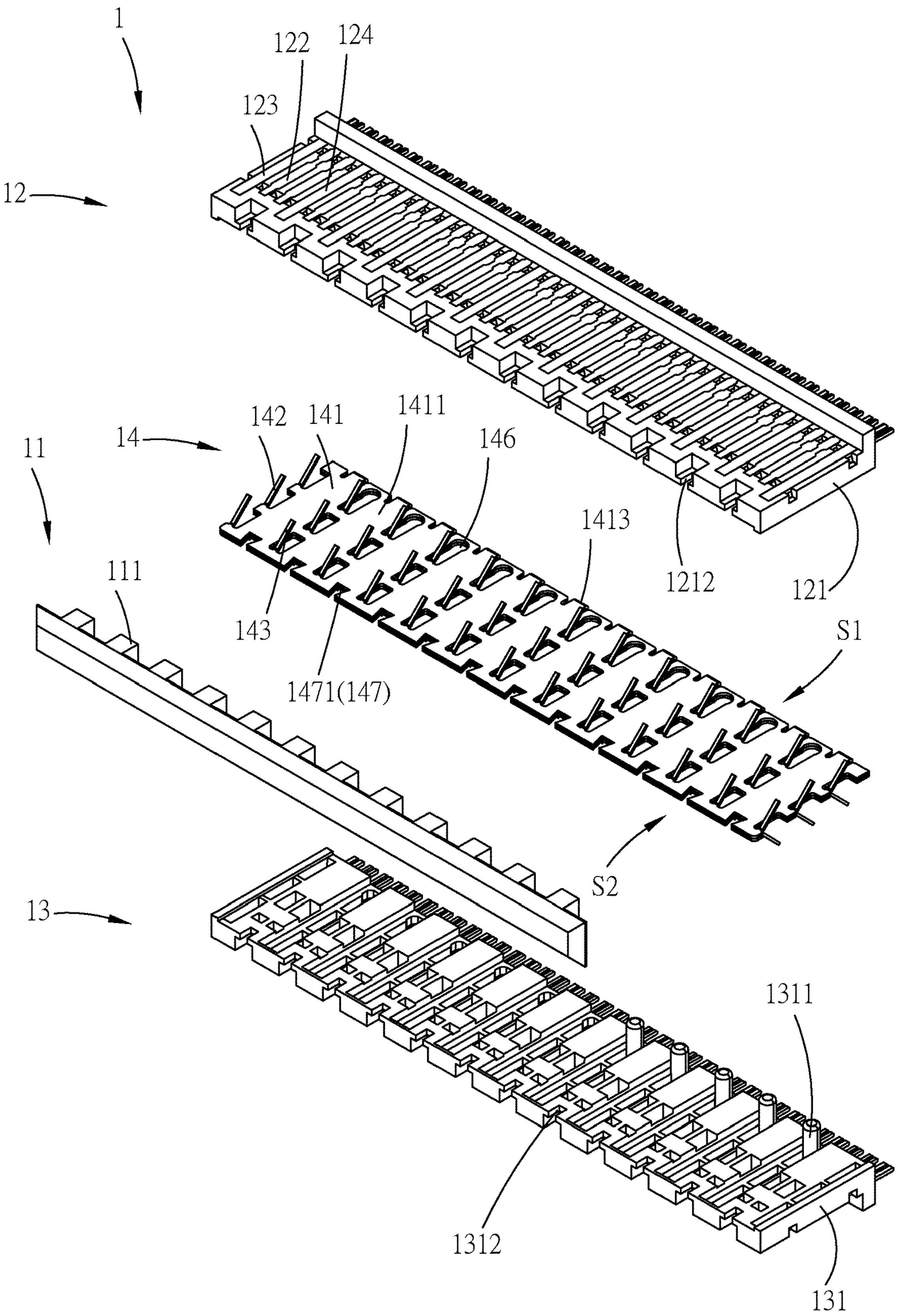
FIG. 6 is a three-dimensional schematic diagram of some components of an embodiment of the electrical connector assembly of the present application in a first angle of view in an embodiment.
Figure 7:
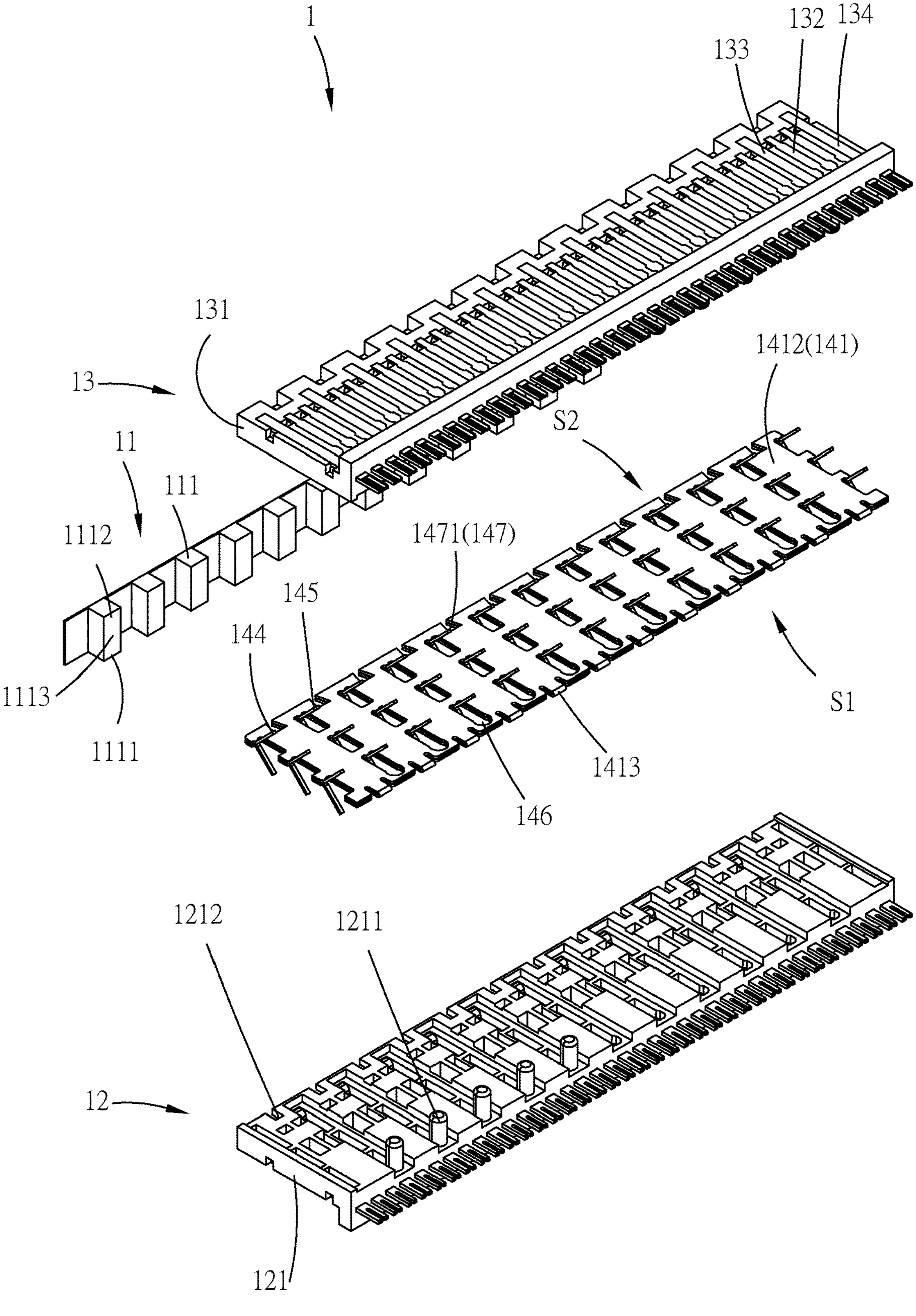
FIG. 7 is a three-dimensional schematic diagram of some components of an embodiment of the electrical connector assembly of the present application in a second angle of view in an embodiment.
Figure 8:
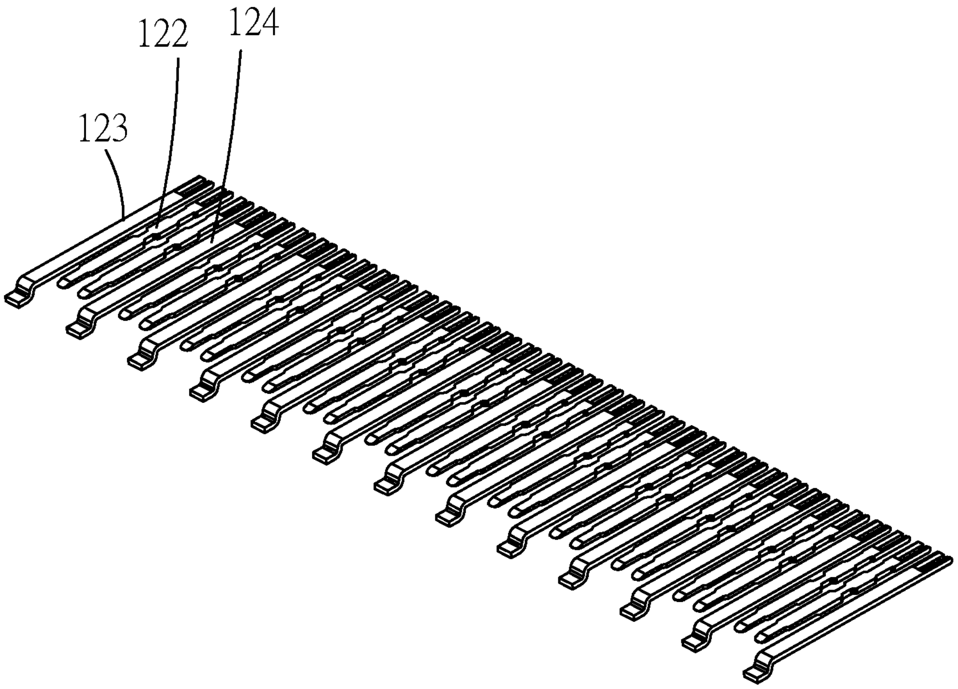
FIG. 8 is a three-dimensional schematic diagram of some components of an embodiment of the electrical connector assembly of the present application in an exemplary embodiment.
Figure 9:
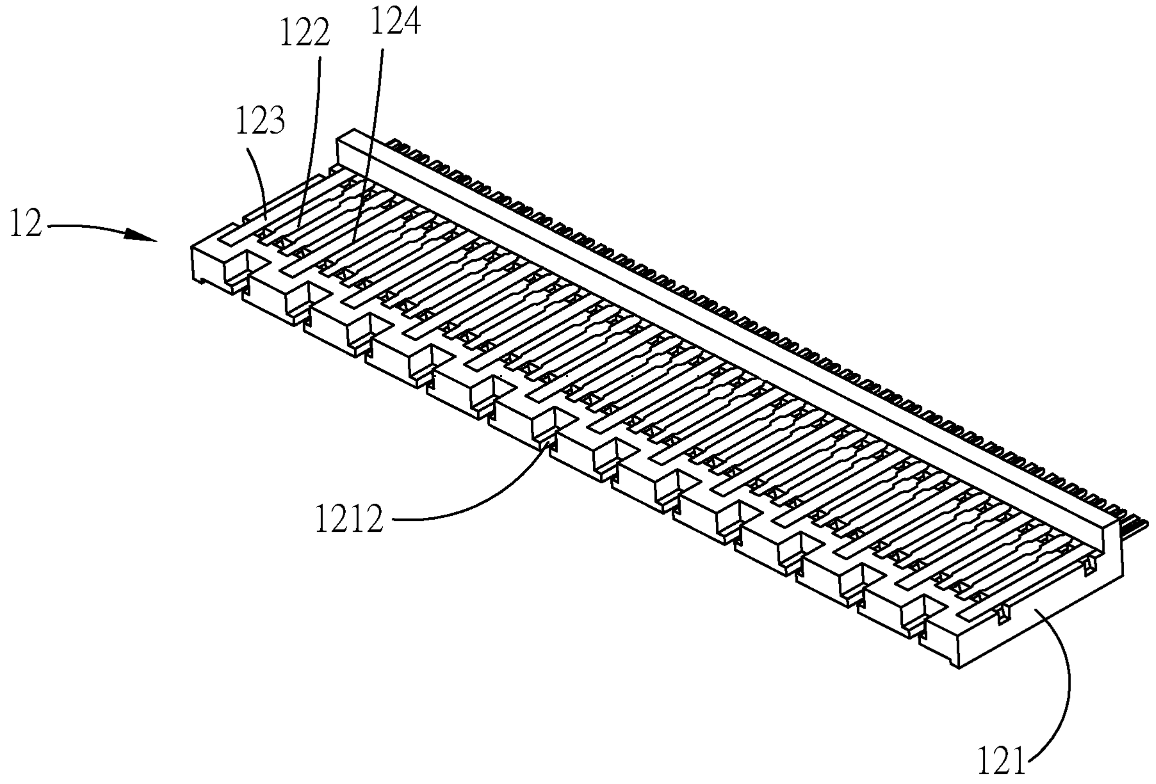
FIG. 9 is a three-dimensional schematic diagram of some components of an embodiment of the electrical connector assembly of the present application in an exemplary embodiment.
Figure 10:
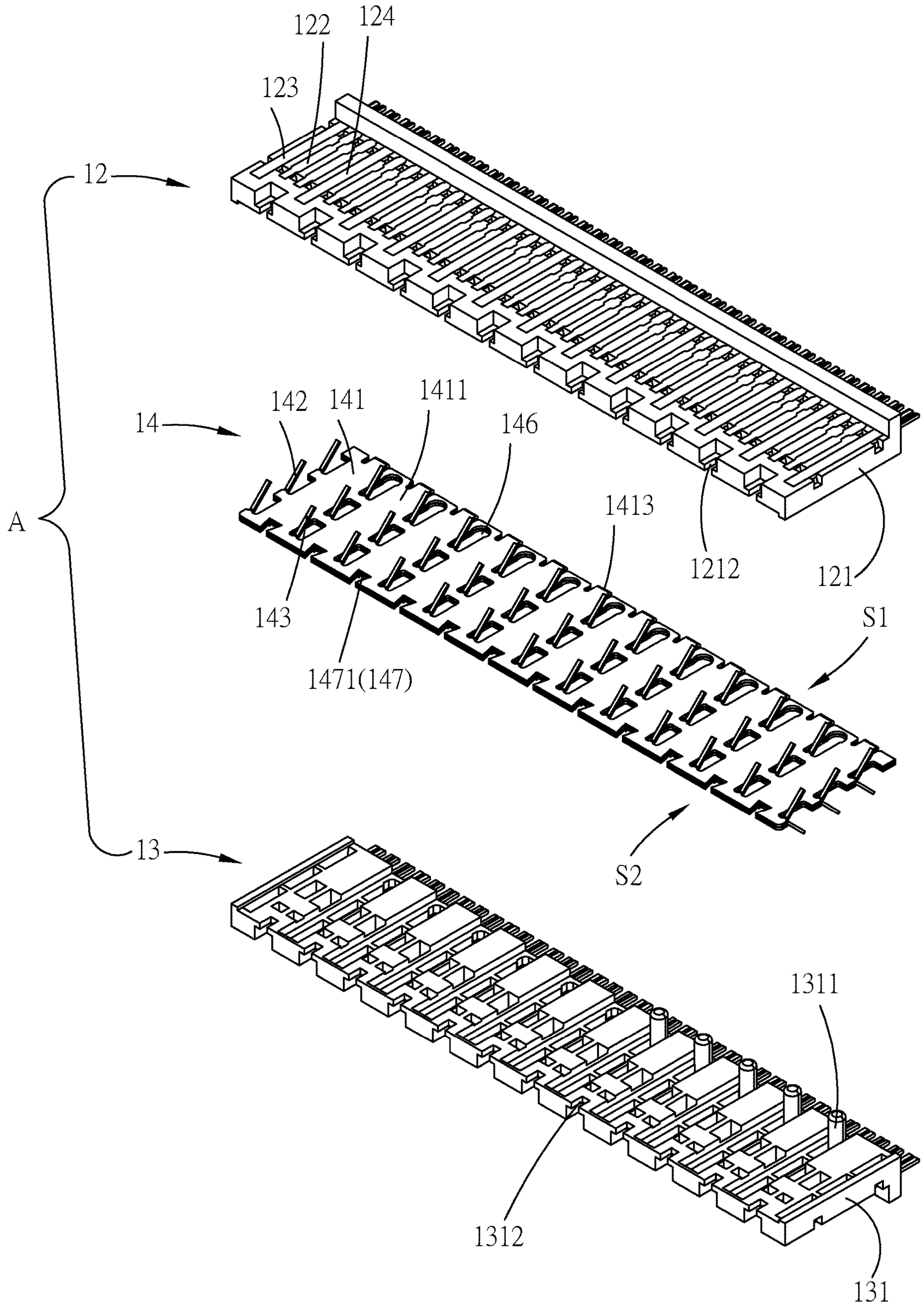
FIG. 10 is a three-dimensional schematic diagram of some components of an embodiment of the electrical connector assembly of the present application in a first angle of view in an embodiment.
Figure 11:
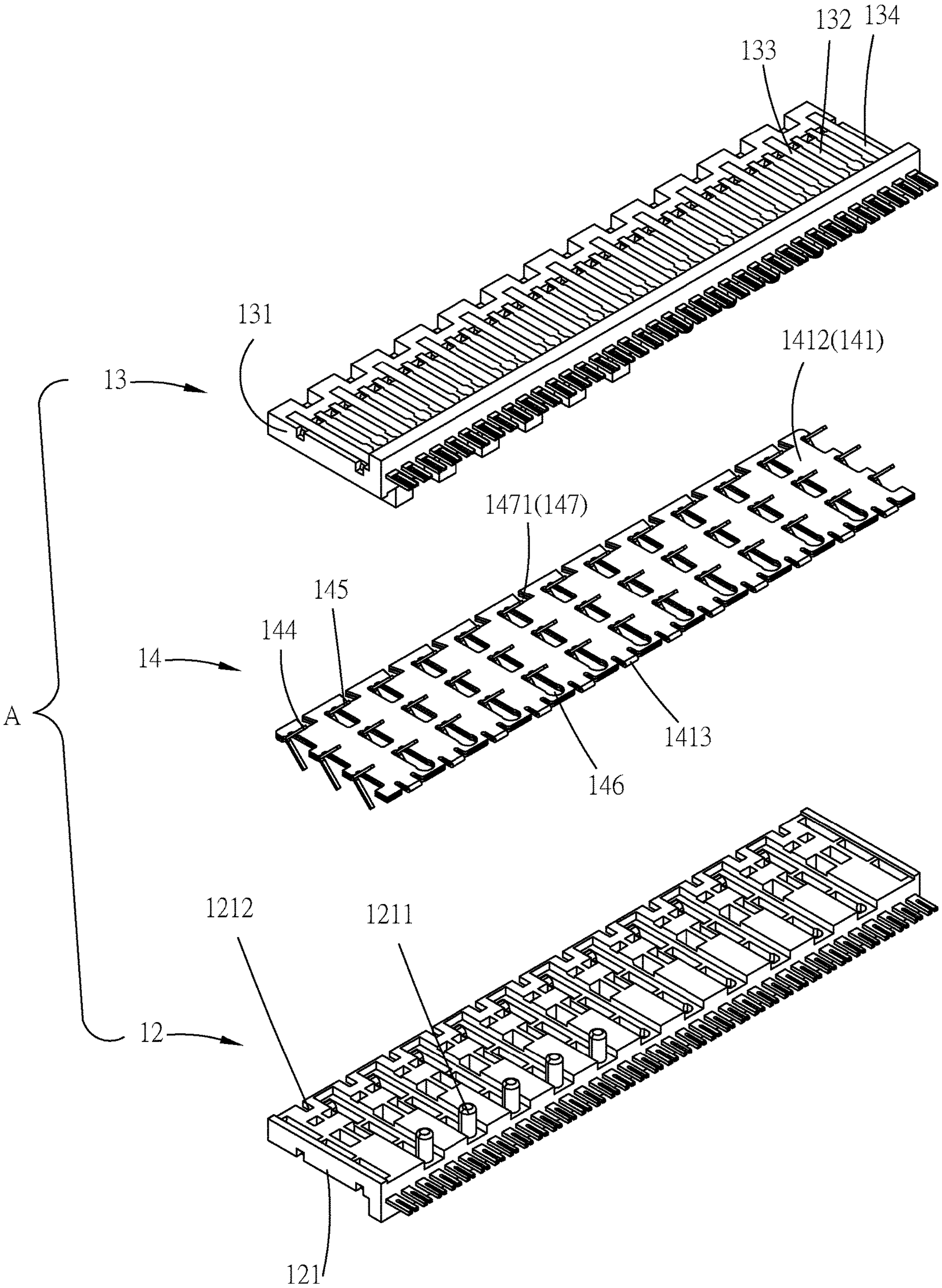
FIG. 11 is a three-dimensional schematic diagram of some components of an embodiment of the electrical connector assembly of the present application in a second angle of view in an embodiment.
Figure 12:
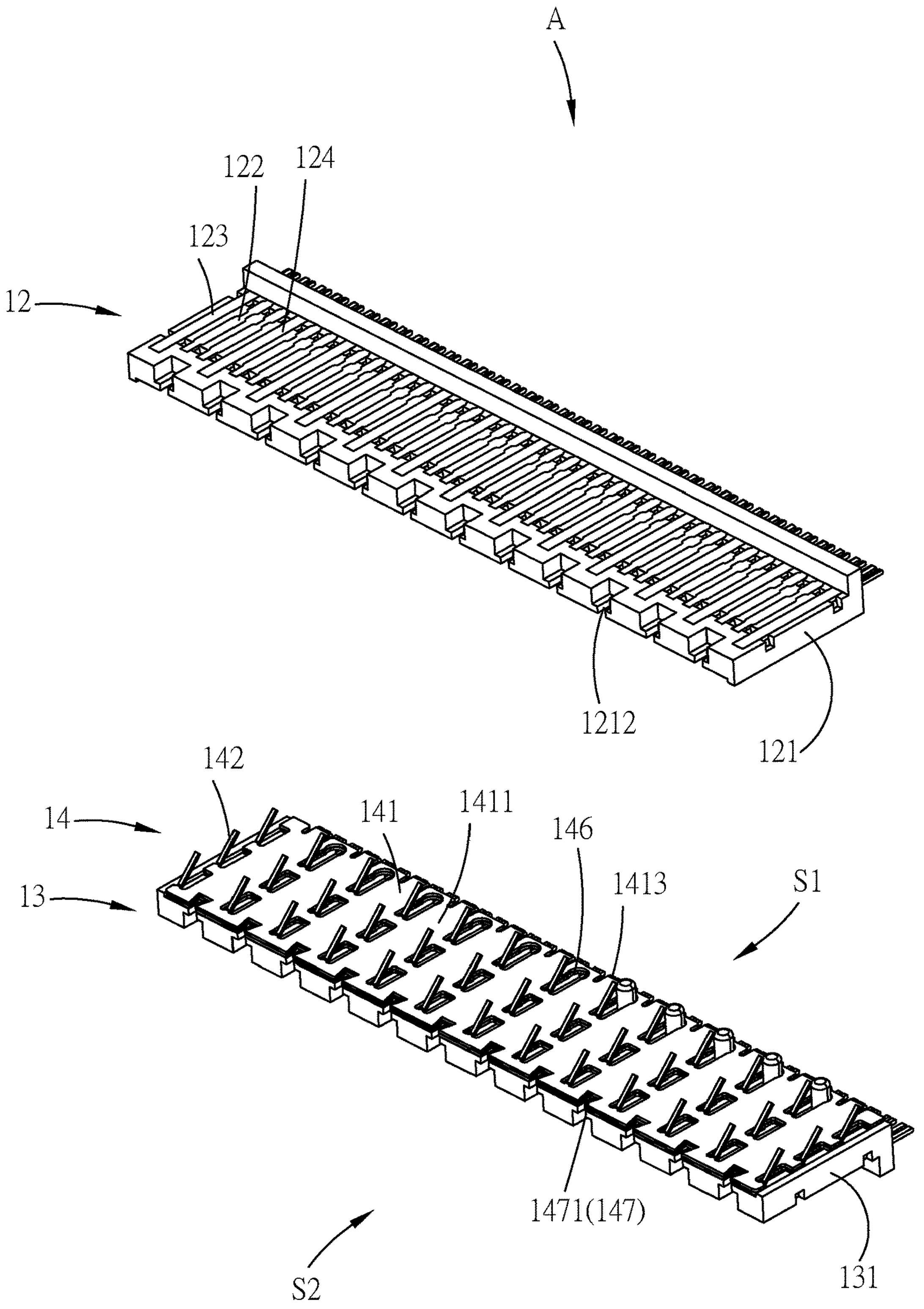
FIG. 12 is a three-dimensional schematic diagram of some components of an embodiment of the electrical connector assembly of the present application in a first angle of view in an embodiment.
Figure 13:
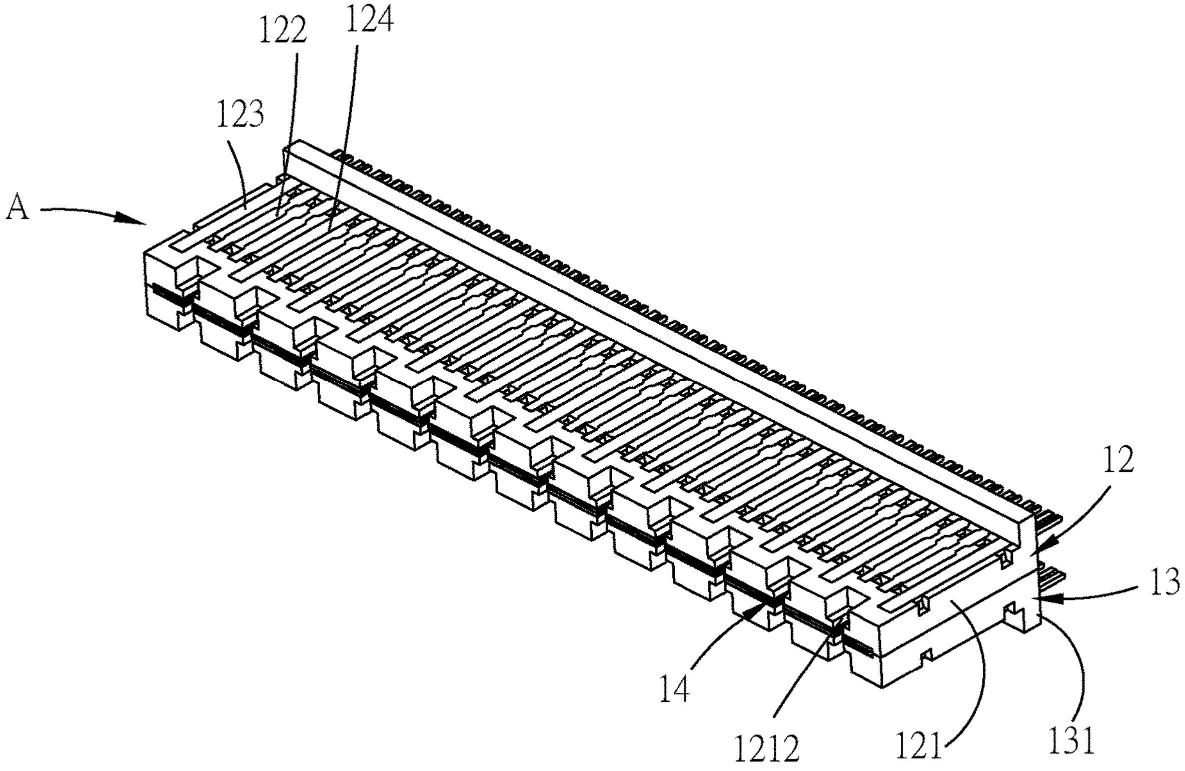
FIG. 13 is a three-dimensional schematic diagram of some components of an embodiment of the electrical connector assembly of the present application in a first angle of view in an embodiment.

It should be noted that, as shown in FIGS. 4 and 5, in the colloid material combination C, the joining insulation colloid material 11, the major insulation colloid material 121, and the minor insulation colloid material 131 can be joined with a seam by such as snapping method. It is not limited to this, as shown in FIGS. 4A and 5A, in the colloid material combination C, the joining insulation colloid material 11, the major insulation colloid material 121, and the minor insulation colloid material 131 can be seamlessly joined through methods such as high-frequency welding or integral molding.

In the embodiments shown in FIGS. 1 to 7, the colloid material joining structure 111 comprises a major colloid material joining substructure 1111, a minor colloid material joining substructure 1112, and a bridging colloid material joining substructure 1113. The major colloid material joining substructure 1111, the minor colloid material joining substructure 1112, and the bridging colloid material joining substructure 1113 can be respectively joined to the major electrical connector component joining structure 1212, the minor electrical connector component joining structure 1312, and the bridging conductive component joining structure 147 which are groove structures. However, it should be noted that the major electrical connector component joining structure 1212, the minor electrical connector component joining structure 1312, and the bridging conductive component joining structure 147 are not limited to groove structures.

In the above embodiments, the bridging conductive component joining structure 147 has a bridging conductive component snapping joining substructure 1471. As shown in FIGS. 6 to 7 and FIGS. 10 to 13, the bridging conductive component snapping joining substructure 1471 is a dovetail-shaped groove structure that can snap into the colloid material joining structure 111, allowing the joining insulation colloid material 11 is joined to the electrical connector assembly combination A. However, it should be noted that the bridging conductive component snapping joining substructure 1471 is not limited to a dovetail-shaped groove structure.

In the above embodiments, the manufacturing of the electrical connector assembly 1 includes the following steps: Step one, placing the bridging conductive component 14 between the major electrical connector component 12 and the minor electrical connector component 13. Next, step two, combining the major electrical connector component 12, the bridging conductive component 14, and the minor electrical connector component 13 to form the electrical connector assembly combination A. Subsequently, step three, allowing the joining insulation colloid material 11 to join the electrical connector assembly combination A, maintaining the assembly of the major electrical connector component 12, the bridging conductive component 14, and the minor electrical connector component 13.

It should be noted that the joining insulation colloid material 11 can be omitted, and correspondingly, the major insulation colloid material 121 and the minor insulation colloid material 131 can be combined to form the colloid material assembly C through methods such as high-frequency welding or integral molding. In this way, the step three mentioned above, regarding the joining of the joining insulation colloid material 11 to the electrical connector assembly combination A, can be omitted.

It should be noted that the manufacturing method of the electrical connector assembly 1 in this application at least includes the step of assembly of the major electrical connector component 12, the minor electrical connector component 13, and the bridging conductive component 14. Therefore, in the assembly step of the electrical connector assembly 1, the customization of the electrical connection relationship of conductive terminals can be achieved by adjusting the major electrical connector component 12, the minor electrical connector component 13, and the bridging conductive component 14. This customization aims to meet the requirements of the electrical connector assembly 1 for signal transmission, satisfying the specific needs and developments in electric devices.

It should be noted that the electrical connector assembly and its manufacturing method provided in this application can omit the aforementioned specific features. For example, in this application, the electrical connector assembly includes a joining insulation colloid material, a major electrical connector component, a minor electrical connector component, and a bridging conductive component. The joining insulation colloid material has a colloid material joining structure. The major electrical connector component has a major insulation colloid material, a major non-bridging conductive terminal, a major first bridging conductive terminal, and a major second bridging conductive terminal. The major insulation colloid material positions the major non-bridging conductive terminal, the major first bridging conductive terminal, and the major second bridging conductive terminal, allowing the major non-bridging conductive terminal, the major first bridging conductive terminal, and the major second bridging conductive terminal to be separated. The major insulation colloid material has a major electrical connector component combining structure and a major electrical connector component joining structure. The minor electrical connector component has a minor insulation colloid material, a minor non-bridging conductive terminal, a minor first bridging conductive terminal, and a minor second bridging conductive terminal. The minor insulation colloid material positions the minor non-bridging conductive terminal, the minor first bridging conductive terminal, and the minor second bridging conductive terminal, allowing the minor non-bridging conductive terminal, the minor first bridging conductive terminal, and the minor second bridging conductive terminal to be separated. The minor insulation colloid material has a minor electrical connector component combining structure and a minor electrical connector component joining structure. The bridging conductive component has a bridging conductive component body, a major first abutting structure, a major second abutting structure, a minor first abutting structure, a minor second abutting structure, a bridging conductive component combining structure, and a bridging conductive component joining structure, wherein the bridging conductive component is located between the major electrical connector component and the minor electrical connector component, allowing the major electrical connector component combining structure, the bridging conductive component combining structure, and the minor electrical connector component combining structure to be configured to be compatible, enabling the major electrical connector component, the bridging conductive component, and the minor electrical connector component to be combined to an electrical connector assembly combination. In the electrical connector assembly combination, the bridging conductive component body spans over the major non-bridging conductive terminal and the minor non-bridging conductive terminal, allowing the major first abutting structure, the major second abutting structure, the minor first abutting structure, and the minor second abutting structure to respectively abut the major first bridging conductive terminal, the major second bridging conductive terminal, the minor first bridging conductive terminal, and the minor second bridging conductive terminal. Additionally, the joining insulation colloid material joins the electrical connector assembly combination, allowing the joining insulation colloid material, the major insulation colloid material, and the minor insulation colloid material to combine into a colloid material combination, ensuring that the colloid material joining structure, the major electrical connector component joining structure, the minor electrical connector component joining structure, and the bridging conductive component joining structure can be configured to be compatible, maintaining the combination of the major electrical connector component, the bridging conductive component, and the minor electrical connector component.

Additionally, in the manufacturing method of the electrical connector assembly disclosed in this application, the steps include: placing the bridging conductive component between the major electrical connector component and the minor electrical connector component; and combining the major electrical connector component, the bridging conductive component, and the minor electrical connector component into an electrical connector assembly combination.

Furthermore, in the manufacturing method of the electrical connector assembly disclosed in this application, the steps include: placing the bridging conductive component between the major electrical connector component and the minor electrical connector component; combining the major electrical connector component, the bridging conductive component, and the minor electrical connector component into an electrical connector assembly combination; and allowing the joining insulation colloid material to join the electrical connector assembly combination, thereby maintaining the combination of the major electrical connector component, the bridging conductive component, and the minor electrical connector component.

In summary, this application provides an electrical connector assembly and its manufacturing method. The electrical connector assembly includes a bridging conductive component, which achieves the electrical connection of multiple conductive terminals without using jumper wires, meeting the requirements for signal transmission in the electrical connector assembly. The manufacturing method of the electrical connector assembly involves the step of combining multiple electrical connector components with the bridging conductive component. Therefore, during the assembly of the electrical connector assembly, customization of the electrical connection relationship of conductive terminals can be achieved by adjusting multiple electrical connector components and the bridging conductive component. This customization ensures compliance with the requirements for signal transmission in the electrical connector assembly, meeting the specific needs and developments of electronic devices.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

The invention claimed is:

1. An electrical connector assembly comprising:

a joining insulation colloid material, including a colloid material joining structure;

a major electrical connector component, including a major insulation colloid material, a major non-bridging conductive terminal, a major first bridging conductive terminal and a major second bridging conductive terminal, wherein the major insulation colloid material positions and separates the major non-bridging conductive terminal, the major first bridging conductive terminal and the major second bridging conductive terminal, and the major insulation colloid material includes a major electrical connector component combining structure and a major electrical connector joining structure;

a minor electrical connector component, including a minor insulation colloid material, a minor non-bridging conductive terminal, a minor first bridging conductive terminal and a minor second bridging conductive terminal, wherein the minor insulation colloid material positions and separates the minor non-bridging conductive terminal, the minor first bridging conductive terminal and the minor second bridging conductive terminal, and the minor insulation colloid material includes a minor electrical connector component combining structure and a minor electrical connector joining structure; and a bridging conductive component, including a bridging conductive component body, a major first abutting structure, a major second abutting structure, a minor first abutting structure, a minor second abutting structure, a bridging conductive component combining structure and a bridging conductive component joining structure;

wherein the bridging conductive component is located between the major electrical connector component and the minor electrical connector component so that the major electrical connector component combining structure, the bridging conductive component combining structure and the minor electrical connector component combining structure can coordinate, allowing the major electrical connector component, the bridging conductive component and the minor electrical connector component can be combined to form an electrical connector assembly combination;

the bridging conductive component body bridges the major non-bridging conductive terminal and the minor non-bridging conductive terminal in the electrical connector assembly combination, allowing the major first abutting structure, the major second abutting structure, the minor first abutting structure and the minor second abutting structure separately abut against the major first bridging conductive terminal, the major second conductive terminal, the minor first conductive terminal and the minor second conductive terminal; and the joining insulation colloid material joins the electrical connector assembly combination so that the joining insulation colloid material, the major insulation colloid material and the minor insulation colloid material form a colloid material combination, allowing the colloid material joining structure, the major electrical connector component joining structure, the minor electrical connector component joining structure and the bridging conductive component joining structure can coordinate to maintain the combination of the major electrical connector component, the bridging conductive component and the minor electrical connector component.

2. The electrical connector assembly of claim 1, wherein the joining insulation colloid material, the major insulation colloid material and the minor insulation colloid material are seamlessly combined in the colloid material combination.

3. The electrical connector assembly of claim 1, wherein the joining insulation colloid material, the major insulation colloid material and the minor insulation colloid material are combined with seams in the colloid material combination.

4. The electrical connector assembly of claim 1, wherein the colloid material joining structure includes a major colloid material joining substructure, a minor colloid material joining substructure and a bridging colloid material joining substructure, wherein the major colloid material joining substructure, the minor colloid material joining substructure and the bridging colloid material joining substructure can separately join the major electrical connector component joining structure, the minor electrical connector component joining structure and the bridging conductive component joining structure.

5. The electrical connector assembly of claim 1, wherein the bridging conductive component joining structure includes a bridging conductive component snapping joining substructure, which snaps the colloid material joining structure to maintain the joining of the joining insulation colloid material and the electrical connector assembly combination.

6. The electrical connector assembly of claim 5, wherein the bridging conductive component snapping joining substructure is a groove structure of a dovetail shape.

7. The electrical connector assembly of claim 1, wherein the major electrical connector component joining structure, the minor electrical connector component joining structure and the bridging conductive component joining structure are groove structures.

8. The electrical connector assembly of claim 1, wherein the bridging conductive component body includes a major bridging wall structure and a minor bridging wall structure; the major first abutting structure and the major second abutting structure are placed on the major bridging wall structure which faces toward the major electrical connector component and crosses over the major non-bridging conductive terminal, allowing the major first abutting structure and the major second abutting structure separately abut against the major first bridging conductive terminal and the major second bridging conductive terminal; and the minor first abutting structure and the minor second abutting structure are placed on the minor bridging wall structure which faces toward the minor electrical connector component and crosses over the minor non-bridging conductive terminal, allowing the minor first abutting structure and the minor second abutting structure separately abut against the minor first bridging conductive terminal and the minor second bridging conductive terminal.

9. The electrical connector assembly of claim 1, wherein the bridging conductive component body includes a connected bending structure, which connects to the major bridging wall structure and the minor bridging wall structure and is bent to make the major bridging wall structure and the minor bridging wall structure separately face toward the major electrical connector component and the minor electrical connector component.

10. The electrical connector assembly of claim 1, wherein the electrical connector assembly combination includes a combining side and a joining side wherein the combining side and the joining side are opposite two sides, wherein the major electrical connector component combining structure, the minor electrical connector component combining structure and the bridging conductive component combining structure are located at the combining side, and the major electrical connector component joining structure, the minor electrical connector component joining structure and the bridging conductive component joining structure are located at the joining side.

11. The electrical connector assembly of claim 1, wherein the major electrical connector component combining structure and the minor electrical connector component combining structure are concave-convex structures that structurally coordinate; and the bridging conductive component combining structure is a through-hole structure that can pass through the major electrical connector component combining structure or the minor electrical connector component combining structure.

12. A manufacturing method of the electrical connector assembly of claim 1, comprising the following steps:

placing the bridging conductive component between the major electrical connector component and the minor electrical connector component; and combining the major electrical connector component, the bridging conductive component and the minor electrical connector component to form the electrical connector assembly combination.

13. A manufacturing method of the electrical connector assembly of claim 1, comprising the following steps:

placing the bridging conductive component between the major electrical connector component and the minor electrical connector component;

combining the major electrical connector component, the bridging conductive component and the minor electrical connector component to form the electrical connector assembly combination; and joining the joining insulation colloid material to the electrical connector assembly combination to maintain the combination of the major electrical connector component, the bridging conductive component and the minor electrical connector component.

* * * * *